United States Patent [19]
Chereisky et al.

[11] Patent Number: 5,696,198
[45] Date of Patent: Dec. 9, 1997

[54] POROUS ELECTROCONDUCTIVE COMPOSITE MATERIAL, AND METHOD OF MANUFACTURING THE SAME

[75] Inventors: Zinovy Chereisky, Bensalem, Pa.; Mikhail Levit, Lowell, Mass.

[73] Assignee: Electrosorbent, Inc., Philadelphia, Pa.

[21] Appl. No.: 592,840

[22] Filed: Jan. 22, 1996

[51] Int. Cl.$^6$ .................. C08K 3/04; H01B 1/04
[52] U.S. Cl. ............... 524/496; 252/511; 524/495
[58] Field of Search ............... 252/511; 524/495, 524/496

[56] References Cited

U.S. PATENT DOCUMENTS

| | | | |
|---|---|---|---|
| 3,420,913 | 1/1969 | Railsback | 524/496 |
| 3,711,428 | 1/1973 | Aycock et al. | 252/511 |
| 4,386,168 | 5/1983 | Fujimaki et al. | 524/496 |
| 4,451,590 | 5/1984 | Fujimaki et al. | 524/496 |
| 4,971,726 | 11/1990 | Maeno et al. | 524/496 |
| 5,395,864 | 3/1995 | Miyoshi et al. | 524/495 |

FOREIGN PATENT DOCUMENTS

| | | | |
|---|---|---|---|
| 0428991 | 5/1991 | European Pat. Off. | 524/496 |
| 0202576 | 8/1990 | Japan | 524/495 |

*Primary Examiner*—Peter A. Szekely
*Attorney, Agent, or Firm*—Ilya Zborovsky

[57] ABSTRACT

A composite material has a porous carbon filler; an electroconductive filler; and a matrix.

5 Claims, 7 Drawing Sheets

POROUS ELECTROCONDUCTIVE COMPOSITE MATERIAL, AND METHOD OF MANUFACTURING THE SAME

BACKGROUND OF THE INVENTION

The present invention relates to a porous electroconductive composite material, as well as to a method of manufacturing the same.

Natural and synthetic carbon-containing sorbents are widely known. They are used as a rule as grains of powders, carbon black, pellets, dispersed fibers for purification of gaseous and liquid media and also in biology and medicine.

Also known—Filtering polymer membranes based on porous fibers and films; paper and cardboard are provided for purification of water, photoresistors, solvents, etc. and used in chemical, oil processing and pharmaceutical industries.

Also known—Heterogeneous, ion-exchange resins or ion membranes are composed of polymer matrix and a filler of fine dispersion particles. The ion transition process in them is regulated by the value of voltage supplied to a surface of the membrane. Specific surface resistivity of the ion exchange membranes are $p_v=0.1-0.3$ ohm.m while the resistivity in I N-solution of NaCl $p_v=1-2$ ohm.m.

Also known—Electroconductive polymer materials with a specific volume resistivity $r_v=10^{-1}-10^{-3}$ ohm.m are composed of a polymer matrix with electroconductive filler such as metal powder, or carbon black, or dispersed carbon fiber. These materials are disclosed for example in U.S. Pat. Nos. 4,664,971, 4,978,649, 4,692,272, 4,966,729, 5,204,310, 5,304,527, 5,407,889, 5,422,330, as well as in French patents 2,321,751, 2,374,357; 2,432,037; 2,443,123 and Japanese patents 5,712,061, and 6,031,540.

The above listed materials have some disadvantages. The existing carbon fiber sorbents do not possess sufficient strength and are easily destructible under the action of hydrodynamic loads during the process of filtration. They have non-uniform properties, and are frequently allergic. The filtering polymer membranes based on porous fibers and films do not allow the use of an electric field for regulation of sorption and desorption processes, or they use it insufficiently efficient due to their low electrical conductivity. Ion membranes have the same disadvantages. The electroconductive polymer materials have low porosity. Therefore they cannot be used as sorbents, separating membranes and filters.

SUMMARY OF THE INVENTION

Accordingly, it is an object of the present invention to provide a porous electroconductive composite material and a method of manufacturing the same; which avoids the disadvantages of the prior art.

In keeping with these objects and with others which will become apparent hereinafter, one feature of the present invention resides, briefly stated, in a porous electroconductive material composed of a porous carbon filler, an electroconductive filler, and a matrix, to be used as a sorbent and/or a filtrating separating membrane. The filler can be a mixture of highly porous and grafitized carbon materials, and the matrix is composed of porous or non-porous polymers with aliphatic, aromatic, or crosslinked structure.

When the composite material is made in accordance with the present invention is combines high volume porosity up to $6.10^{-4}$ m$^3$/kg, permeability up to 2 cm$^3$/sec.cm$^2$ determined by the number of cm$^3$ of liquid which passes per one sec through one cm$^2$ area of a material, and electroconductivity $p_v=10^{-5}$ ohm.m, wherein $p_v$ is a specific resistance which is reverse value to the electroconductivity. The high volume porosity is provided because of the presence of the porous filler, as well as by an extensive system of pores at the border of the polymer and the filler.

The method of forming of the composition material, in particular its formation from a solution, melt, or impregnation of non-woven carbon material with a solution of polymer with a subsequent molding, insures that a system of micropores is obtained and they are directed perpendicular to the plane of the composite so as to provide its high permeability. The high value of the electroconductivity is achieved because of the macrocluster structure of the electroconductive filler. The selection of filler dimensions as well as shear stresses during formation of the composition through a spinneret eye overcomes the percolation barrier a low value of the concentration of the filler. The volume porosity and the sizes of the pores can be regulated during the process of manufacture depending on the application of the material. The porous filler can be formed as a mixture of carbon fibers composed of activated carbon fibers (ACF) produced by carbonization of polymeric fibers, or non-woven materials at a temperature of 900° C. with their subsequent activation materials at the temperature 800°–900° C. in atmosphere $CO_2$ or $H_2O$ to 3.5–4 hours.

Other component of the mixture of the carbon fibers are grafitized carbon fibers (ECF). They have high electroconductivity and can be used even as electroconductive carbon fibers. The value of the electroconductivity can be regulated during the manufacturing process in dependence on the specific utilization of the material. The filler can include a combination of two components, in particular a porous carbon material, and an electroconductive material. The porous carbon material can be either activated carbon fibers, or an activated carbon non-woven material, or their mixture. The activated carbon fibers have a volume microporosity $(1-6).10^{-4}$ m$^3$/kg, average diameter 5–15 micrometer (mcm), an average length 0.05–5.0 mm. Their quantity in the finished material is 5–70% from weight of dry polymer. The activated carbon non-woven material has the same volume porosity, and its quantity in the finished material is 50–90% of the Weight of dry polymer. The electroconductive materials are graphitized carbon fibers, metallized fibers, or powders based on them. The electroconductive carbon fibers have specific volume resistance $10^{-2}-10^{-5}$ ohm.m, and average diameter 8–20 mcm, an average length 0.1–10 mm, and its quantity in the finished material, 1–30%.

The matrix of the new composite material is composed of polymers of aliphatic, aromatic, or crosslinked structures.

The novel features which are considered as characteristic for the invention are set forth in particular in the appended claims. The invention itself, however/both as to its construction and its method of operation, together with additional objects and advantages thereof, will be best understood from the following description of specific embodiments when read in connection with the accompanying drawings.

DESCRIPTION OF THE PREFERRED EMBODIMENTS

A porous electroconductive material including carbon fiber fillers and a polymer matrix to be used as a sorbent and/or filtering separating membrane has the filler formed as a mixture of highly porous and grafitized carbon materials, wherein the matrix includes porous or non-porous polymers of aliphatic, aromatic, crosslinked and other structures.

In order to regulate the volume porosity and the size of the pores in the material, the carbon fiber filler, before being mixed with a polymer matrix, is retained in a solvent during 1–10 minutes, and a film which is formed on a substrate of the filler is exposed in the air from 1–5 minutes, and only thereafter supplied to a coagulation bath.

Figure 1:
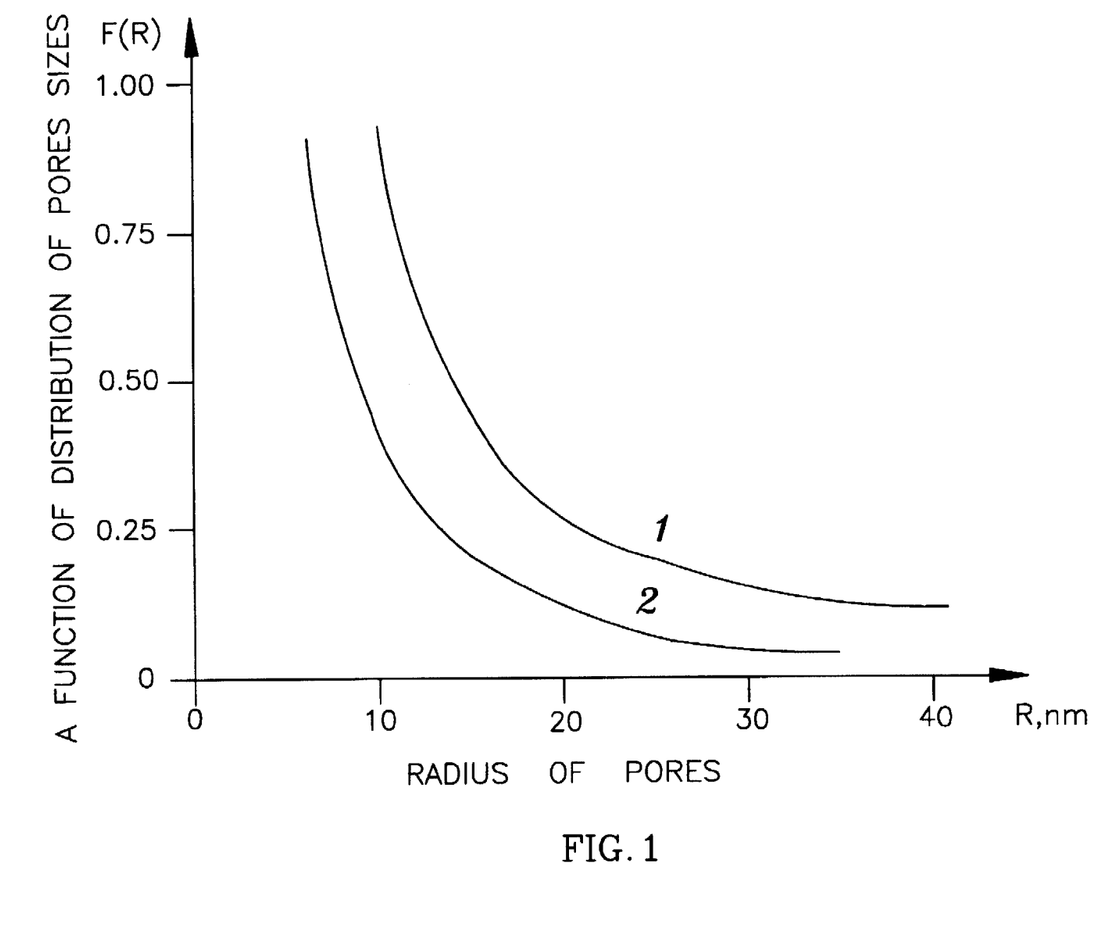
FIG. 1 is a view showing a diagram of a pore distribution function in accordance with sizes, depending on a method of forming of a material in accordance with the present invention.

FIG. 1 illustrates a function of distribution of pores in accordance with sizes (FCR) in a material in accordance with the present invention. It is computed in accordance with data obtained by a small angle X-ray dispersion in dependence on the method of its forming. 1 is a wet forming, while 2 is a dry forming.

Figure 2:
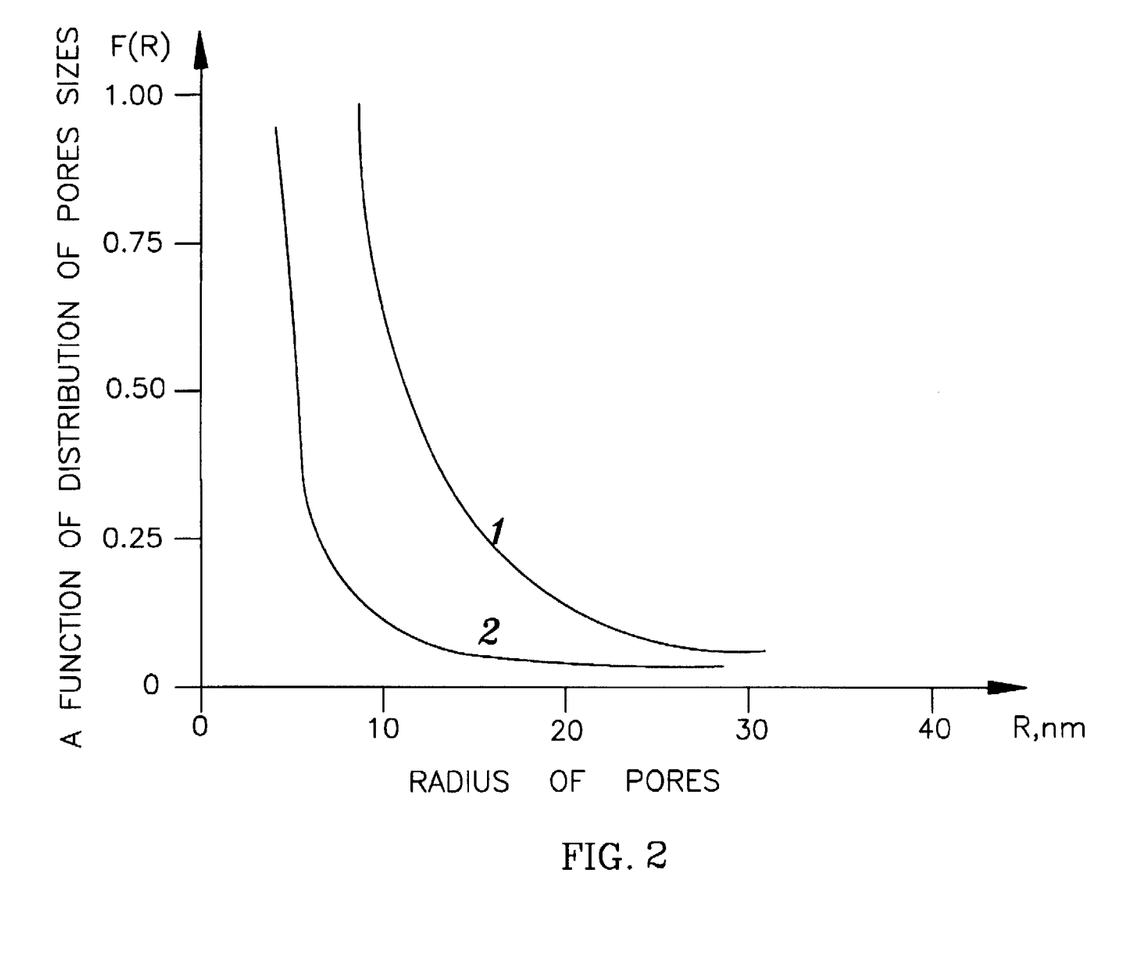
FIG. 2 is a view showing an influence of the content of a composition onto the function of pore distribution of FIG. 1.

FIG. 2 shows the same function F(R) in dependence on the content of a composition, wherein 1 is a copolyamide (CPA)+30% ACP+3% ECF, and 2 is CPA+30% ECF.

Figure 3:
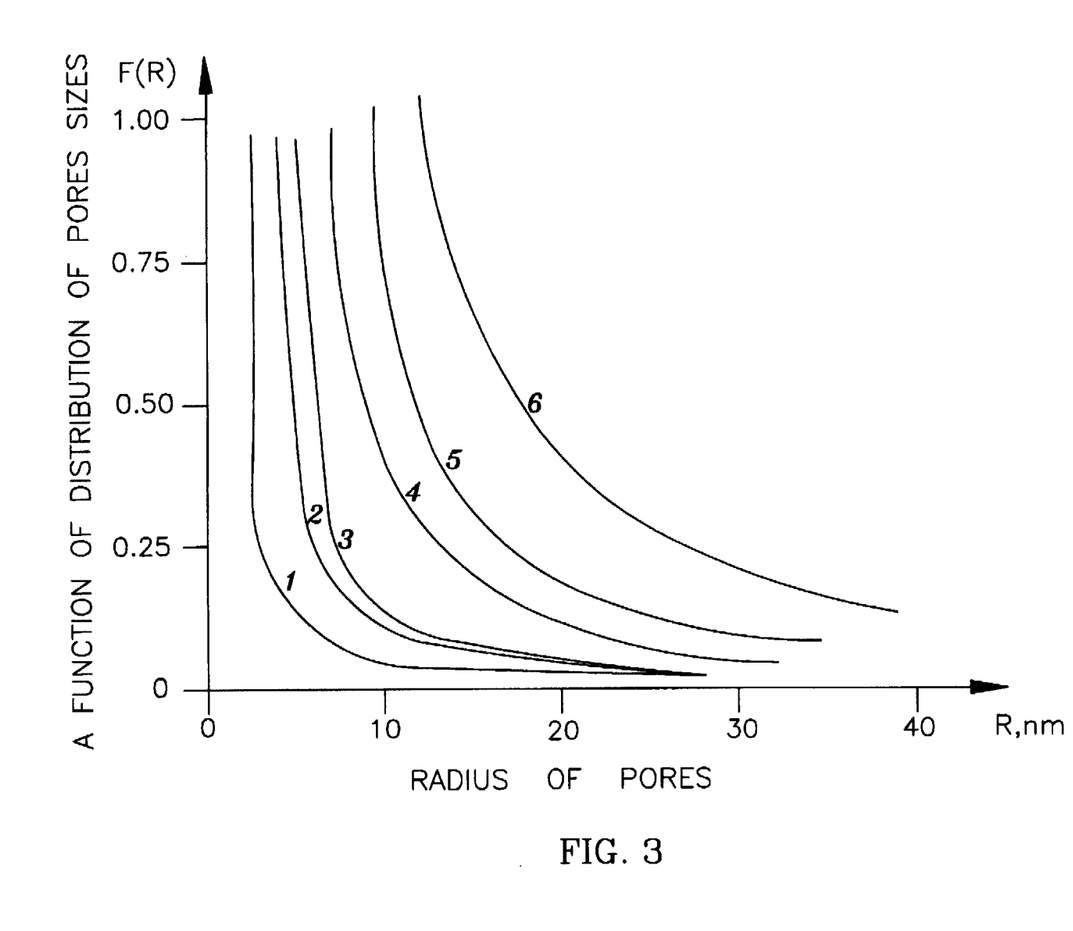
FIG. 3 is a view showing an influence of the content of an activated filler onto the function of pore distribution of FIG. 1.

FIG. 3 illustrates the same function F(R) in dependence on different contents of the activated filler ACF in the composition, wherein 1 is 0%, 2 is 5%, 3 is 30%, 4 is 40%, 5 is 50%, and 6 is 60%.

Figure 4:
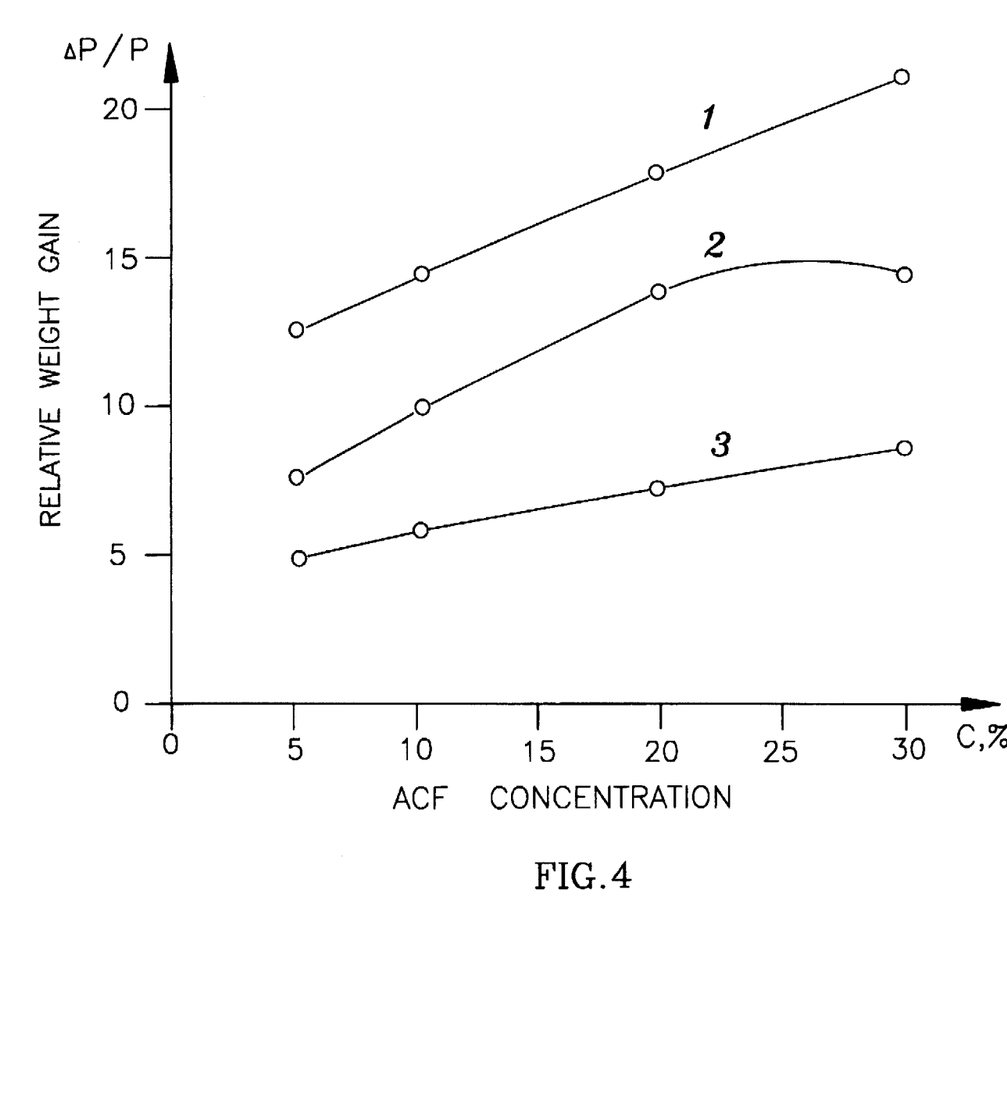
FIG. 4 is a view showing an influence of the content of an activated filler on a sorption of vapors of different substances.

FIG. 4 shows a relative increase of the weight $\Delta p/p$ which characterizes the sorption of vapors of different substances for the composition CPA+30% ACF, wherein 1 is water, 2 is benzene, 3 is methylene blue from a water solution with concentration 0.1M.

Figure 5:
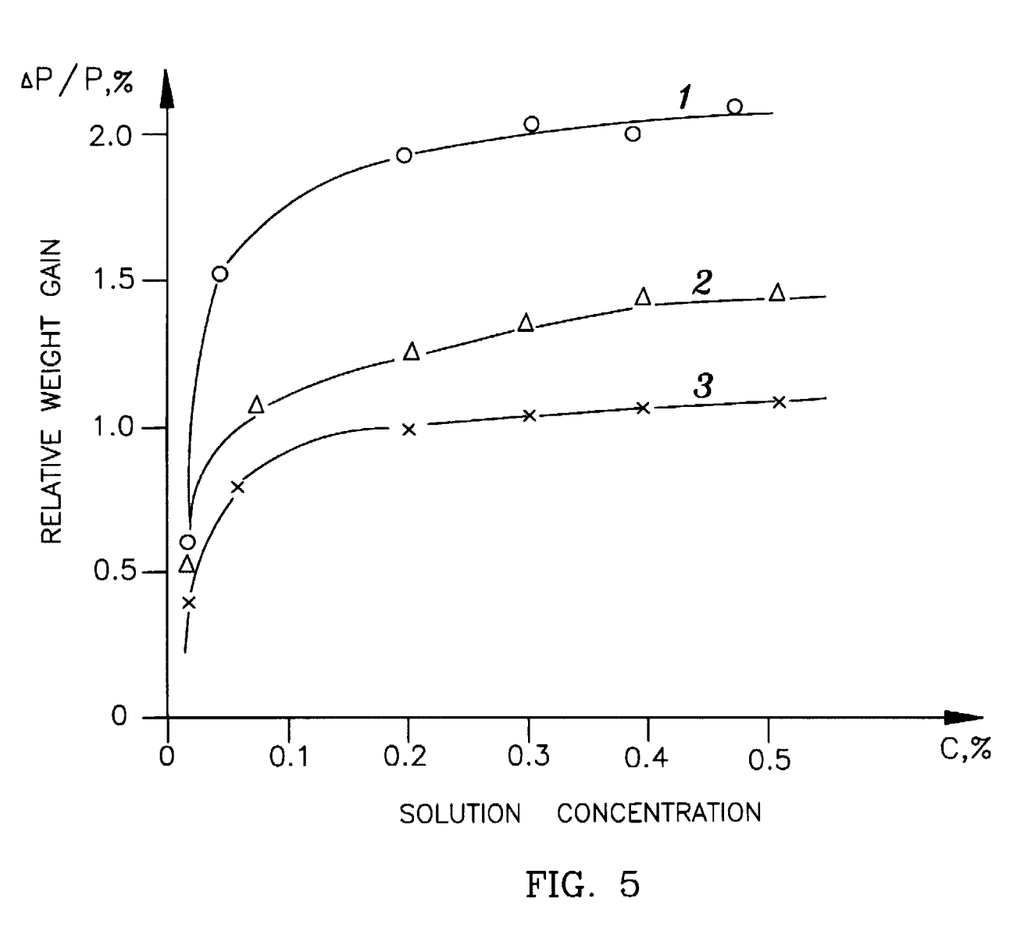
FIG. 5 is a view showing an influence of a concentration of the solution on a sorption of cobalt.

FIG. 5 shows sorption properties of ions $Co^{++}$ in dependence on the concentration of the solution $Co(NO_3)_2$ for compositions of different contents, wherein 1 is CPA+30% ACF, 2 is CPA+30% ECF, 3 is CPA+10% ECF.

Figure 6:
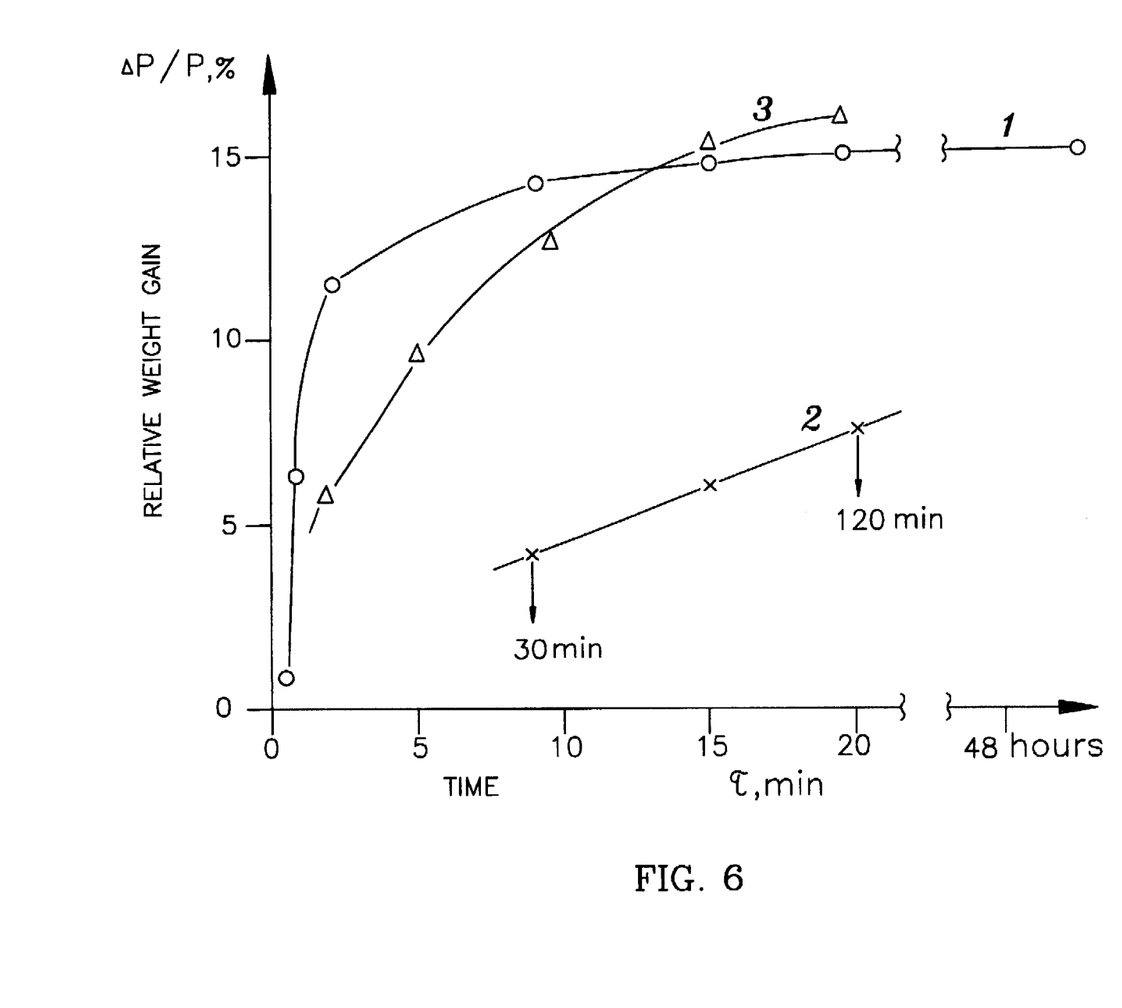
FIG. 6 is a view showing a dependency of the sorption of ions of heavy metals from time.

FIG. 6 illustrated the sorption of ions of heavy metals from solutions independence on the time for the composition having the contents CPA+30% ACF+3% ECF, wherein 1 is $Co^{++}$ from 10% solution of $Co(NO)_2$, 2 is nickel $Ni^{2+}$ from 5% solution of $NiSO_4$, and 3 is chromium $Cr^{3+}$, from 5% solution of $Cr_2(SO_4)_3$.

Figure 7:
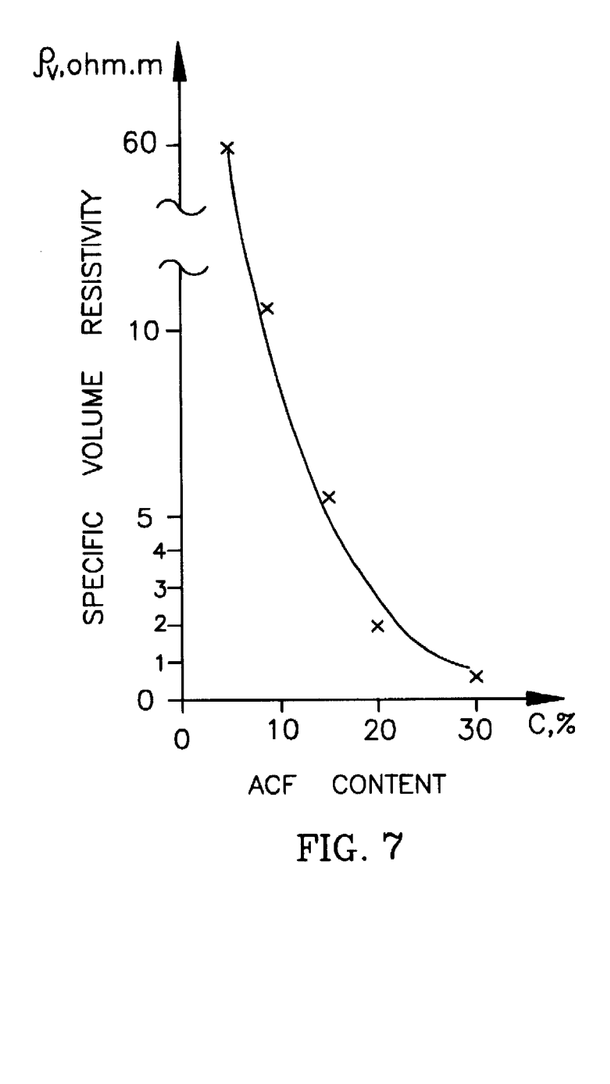
FIG. 7 is a view showing an influence of a specific volume electroresistivity of the material in accordance with the present invention from the content of the activated filler.
Figure 8:
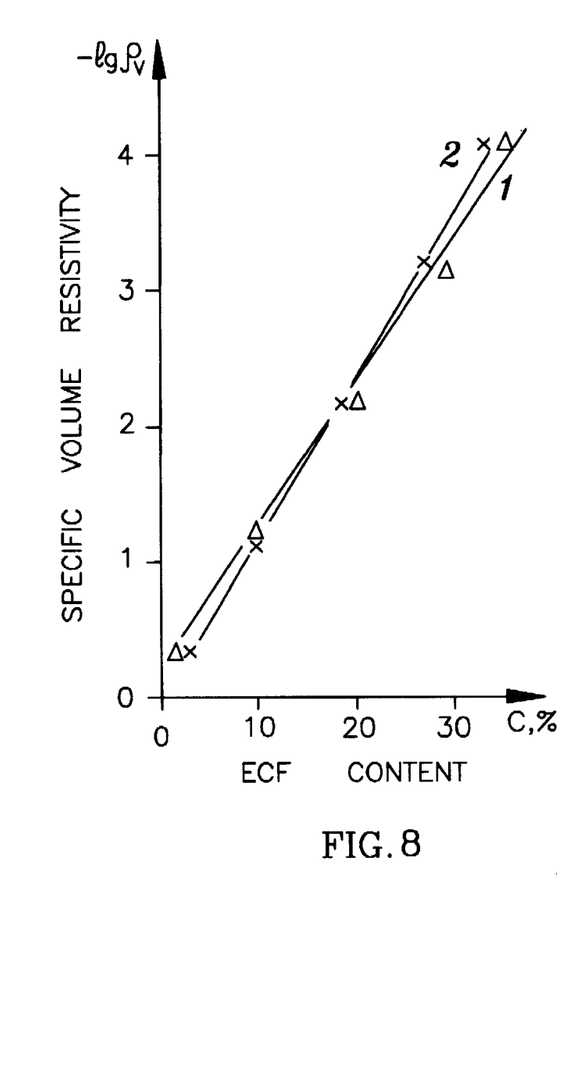
FIG. 8 is a view showing a dependency of the specific volume electroresistivity of the material in accordance with the present invention from the content of an electroconductive filler.

FIGS. 7 and 8 show the dependency of the electroconductivity of the material in accordance with the present invention as a reverse function of the specific volume electro-resistance $\rho_v$ from the content of the filler and polymers of different contents. Here 1 is fluoroolefine copolymers, 2 is copolyamide.

Several examples of the new composite material and method of its manufacture are presented hereinbelow.

EXAMPLE 1

In an aqueous solution of polyvinyl alcohol (PVA) with a concentration of 15% at temperature T=80° C. and during constant mixing, a mixture is introduced which includes ACF with a diameter 10 mkm, length 1 mm and quantity 30% of dry polymer weight (DPW), and ECF with a diameter 12 mkm, length 3 mm, and quantity 30% of DPW. Spinning of film is performed through a gapped spinneret. The solvent is removed by drying at temperatures of 40° C. and T=4 hours. The content of ACF is varied from 5 to 50%, whereas the content of ECF is varied from 1 to 30%.

EXAMPLE 2

The composition of Example 1 is molded in accordance with the wet method in a coagulating bath with the content of $Na_2SO_4$—$H_2O$ (concentration $Na_2SO_4$—350 g/l), and thereafter the produced film is washed and dried at a temperature 40° C. and during T=3 hours. The incidence of the method of forming on F(R) is illustrated in FIG. 1.

EXAMPLE 3

In an alcohol-water solution with 70% $C_2H_5OH$ in 30% of $H_2O$ of aliphatic polyamide which is a copolymer Nylon 66—Nylon 610 and with concentration 15% at a temperature of 70° C., a mixture was introduced with mixing of the mixture, wherein the mixture includes ACF with a diameter 12 mcm, length 100 mkm and quantity 30% of weight of the dry polymers and ECF with average diameter of 8 mkm, length $10^3$ mcm and quantity 3% of DPW. The forming of the film was performed through the gapped spinneret onto the glass substrate. The solvent was removed by drying at temperature of 50° C. during 3 hours. The thickness of the film δ=150 mcm. The data of the function of distribution F(R) of the material, as well as its sorption properties are illustrated in FIGS. 2, 6.

EXAMPLE 4

In polymer solution of Example 3 ACF in the quantity of 30% DPW was introduced into the polymer solution. The forming was performed onto a polished metal substrate. The data of electroconductivity of the sample are presented in FIG. 8. Analogously, materials were obtained with different content of ACF 5–70%, and the data of the properties are presented in FIGS. 3, 5, 7 as well as in the table.

EXAMPLE 5

A composition of the Example 5 corresponds to the composition of Example 3. However, the film cast on the glass substrate was endured in the air during 1–5 minutes for regulation of the size and quantity of pores, and then together with the substrate it was placed into a coagulation aqueous bath at a temperature of 20° C., and dried at temperatures of 20° C. during 4 hours. The thickness of the film was δ=140 mcm.

EXAMPLE 6

In the composition including polyvinyl chloride in dimethylformamide with concentration 10%, a mixture of carbon fibers was introduced which included ACF with a diameter 5 mcm, length 80 mcm and quantity 50% of DPW, and ECF with a diameter 15 mkm, length 1,500 mcm and quantity 10% of DPW. The formation of the film was performed through a gapped spinneret onto the glass substrate. Then the sample was dried at temperature of 40° C. during 3 hours. The thickness of the film was δ=145 mcm.

EXAMPLE 7

In a solution of copolymer including polyvinylidene fluoride 80%, polytetrafluorcethylene 20% in an aprotonic solvent, for example, dimethylacetamide (DMAA), a mixture was introduced which includes ACF with diameter 10 mkm, length 200 mcm and quantity 20% of DPW, and ECF with diameter 20 mcm, length $10^4$ mcm and quantity up to 30% of DPW. The formation of the film was performed through a gapped spinneret in accordance with the dry method. The thickness of the film was 150 mkm. The data of electroconductivity of the films produced with this polymer with different contents of ECF are presented in FIG. 8.

EXAMPLE 8

In 3% solution of polybenzeimidazolamide (PBIA) in dimethylacetamide a mixture of carbon fibers was introduced with mixing, which included ACF with diameter 7 mcm, length 125 mcm and quantity 15% of DPW, and ECF with diameter 8 mkm, length 2,000 mcm, and quantity 10% of DPW. The forming was performed in accordance with the wet method through a gapped spinneret into a coagulating bath including dimethylacetamide 20% and water 80%. The formed film was dried after washing with water in the air at temperature 20° C. during 15 minutes, and then thermally treated at temperatures 270° C. in air in a fixed condition.

EXAMPLE 9

A non-woven material obtained by carbonization from hydrated cellulose or polyacrylonitrilic material at temperature of 900° C. with subsequent activation at 800° C. in the atmosphere of water vapors was impregnated with 5% solution of CPA ($C_2H_5OH$—$H_2O$), see Example 3. After enduring in the air during 5 minutes, it was placed into an aqueous coagulating bath and then dried at 100° C. during 10 minutes.

The subsequent Examples 10 and 11 demonstrate the possibility of regulating of sizes and quantities of pores within wide limits, so that the applications of the new material are substantially expanded.

EXAMPLE 10

For reducing the size of pores in the composition in accordance with the Example 3, the fibers before their introduction into the matrix were endured during approximately 10 minutes in a solvent with the content shown in the Example 3, in order to remove air from the micropores of ACF and ECF. Then the formation was performed in accordance with the method described in the Example 3.

EXAMPLE 11

For increasing the size of pores and the porosity of the material, into the solution described in the Example 3, before mixing with the filler described in Example 3, porous centers were introduced. Such porous centers were for example talc mixed with a surfactant with a quantity of 0.1% and 0.1% of the weighted dry polymer. Then the formation of the film was performed as in the Example 3.

EXAMPLE 12

A mixture composed of ACF with a diameter 10 mkm, length 130 mkm in the quantity of 70% of DPW, and ECF with a diameter 8 mcm, length 1,500 mcm in the quantity of 7% of DPW was introduced into the solution of Example 3. The forming of a film was performed by pressing of the composition through the gapped spinneret with the pressure of $2.10^5$ Pa onto a glass substrate with a subsequent drying as in the Example 3.

It should be mentioned that in all Examples where a special pressure was not shown, the pressure is equal to the atmospheric pressure of approximately $10^5$ Pa.

EXAMPLE 13

ACF with a diameter 10 mcm and length 2,000 mcm in the quantity of 10% of DPW was introduced into an aqueous-alcohol solution ($C_2H_5OH:H_2O$) 70:30 of aliphatic copolyamide with concentration up to 20% at 70° C. The film was formed through a gapped spinneret onto a glass substrate, which in 60 seconds after forming was placed into an aqueous depositing bath at 20° C., then dried at 40° C. during 1 hour. A mixture composed of 15% of solution of the above mentioned polymer with introduced ACF having a diameter of 8 mcm, length 50 mcm, in the quantity of 50% of DPW was formed onto thusly obtained film as a substrate through a gapped spinneret. After retaining in air at 20° C. during 100 sec, the film composition was placed into an aqueous depositing bath at 20° C., then dried during 4 hours at 20° C. The thickness of the film obtained in this manner was 250 mcm.

EXAMPLE 14

ECF with a diameter 11 mkm and a length 1,500 mkm in the quantity of 12% of DPW was introduced into a 4% solution of polymer of Example 8. The film was formed through a gapped spinneret at the pressure of $2.10^5$ Pa onto a glass substrates. The formed film together with the substrate was placed into a depositing bath including DMAA:$H_2O$=20:80. Then it was washed by water and dried. After this, a mixture including 4% solution PBIA in DMAA and ACF with a diameter 8 mcm and a length 70 mkm in the quantity of 40% DPW was formed on it as a substrate through a gapped spinneret at a pressure $2.10^5$ Pa. The obtained film composition was placed into a depositing with a content DMAA:$H_2O$=20:80, and then washed with water and dried. The thickness of the film was 100 mcm.

The sorption, filtering and electro-physical properties of the thusly obtained samples are shown in FIGS. 1–8 and in the table, where the numbers of samples correspond to the numbers of examples.

The following methods have been used for evaluation of properties of the material.

A porous structure was evaluated by an X-ray diffraction in small angles with a subsequent computation of a pore size distribution function in accordance with sizes F(R).

The permeability of membranes N was measured on a standard cell. With the redundant pressure of 0.005 MPa (0.5 kg/cm$^2$), in accordance with the volume of water which has passed through a section of 1 cm$^2$ during 1 second.

The measurement of a free sorption volume $W_s$ performed with a desiccating method; in particular the sorption of vapors of saturation was determined and a relative gain of the weight $\Delta p/p$ was computed.

The sorption of methylene blue was performed from an aqueous solution and evaluated by means of a photoelectric colorimeter.

The electrical volume resistivity was evaluated in accordance with the standard method.

Sorption, Filtering and Electrophysical Properties of New Film Composite Materials

| Number of Examples | Density $\rho$ g/cm³ | Volume Resistivity $\rho_v$ ohm·m | Permeability N cm³/s·sm² | Specific Free Volume $W_s \cdot 10^4$ m³/g | | | |
|---|---|---|---|---|---|---|---|
| | | | | $CCl_4$ | $H_2O$ | $C_2H_5OH$ | $C_6H_6$ |
| 1 | 0.65 | $9.5 \cdot 10^{-5}$ | 0.32 | 3.8 | 2.4 | 3.4 | 2.9 |
| 2 | 0.62 | $3.0 \cdot 10^{-2}$ | 3.0 | 4.1 | 4.5 | — | 3.4 |
| 3 | 0.65 | $2.1 \cdot 10^{-2}$ | 0.28 | 3.9 | 2.3 | 3.6 | 2.8 |
| 4 | 0.66 | $3.0 \cdot 10^{-1}$ | 0.29 | 4.0 | 2.5 | 3.8 | 3.1 |
| 5 | 0.64 | $4.2 \cdot 10^{-1}$ | 0.09 | 3.3 | 4.1 | 4.3 | 3.2 |
| 6 | 0.67 | $4.2 \cdot 10^{-3}$ | 0.15 | 2.6 | 3.1 | 3.5 | 2.8 |
| 7 | 0.72 | $6.1 \cdot 10^{-2}$ | 1.1 | 2.4 | 1.2 | — | 1.4 |
| 8 | 0.70 | $5.3 \cdot 10^{-3}$ | 0.8 | 2.8 | 3.8 | 3.6 | 3.4 |
| 9 | 0.68 | $1.5 \cdot 10^{-4}$ | 0.9 | 3.2 | 2.0 | 2.6 | 2.8 |
| 10 | 0.69 | $3.7 \cdot 10^{-2}$ | 0.18 | 2.9 | 2.8 | 3.0 | 1.9 |
| 11 | 0.63 | $9.0 \cdot 10^{-3}$ | 3.6 | 4.3 | 4.7 | 3.8 | 2.9 |
| 12 | 0.70 | $4.0 \cdot 10^{-4}$ | 0.28 | 4.7 | 4.0 | 4.2 | 3.2 |
| 13 | 0.72 | $1.2 \cdot 10^{-4}$ | 1.25 | 2.8 | 3.1 | 3.5 | 3.0 |
| 14 | 0.69 | $2.3 \cdot 10^{-4}$ | 2.30 | 2.5 | 2.4 | 2.6 | 3.0 |

It will be understood that each of the elements described above, or two or more together, may also find a useful application in other types of methods and materials differing from the types described above.

While the invention has been illustrated and described as embodied in a porous electroconductive composite material, and method of manufacturing the same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A porous electroconductive composite material, comprising a fibrous porous carbon filler; an electroconductive fibrous carbon filler; and a polymeric matrix so as to form together a sorbent.

2. A composite material as defined in claim 1, wherein said porous carbon filler includes activated carbon fibers with a volume porosity $(1-6) \cdot 10^{-4}$ m³/kg, an average diameter 5–15 mcm, an average length 0.05–5.0 mm and a quantity of 5–70% of a dry polymer weight.

3. A composite material as defined in claim 1, wherein said porous carbon filler includes an activated non-woven sheet with a volume porosity $(1-6) \cdot 10^{-4}$ m³/kg with the non-woven sheet constituting 50–95% of a dry polymer weight.

4. A composite material as defined in claim 1, wherein said electroconductive filler includes carbon fibers with a specific volume electro-resistance $10^{-2}$–$10^{-5}$ ohm.m, an average diameter 8–20 mcm, an average length of 0.1–10 mm in the quantity of 1–30% of a dry polymer weight.

5. A composite material as defined in claim 1, wherein said matrix is composed of a polymer selected from the group consisting of an aliphatic polymer, a aromatic polymer and a crosslinked polymer.

* * * * *